United States Patent [19]

Hall

[11] 3,747,915
[45] July 24, 1973

[54] METHOD AND APPARATUS FOR ABSORBING ENERGY

[76] Inventor: Frank Kenneth Hall, 1600 Wilson St., Saginaw, Mich. 48603

[22] Filed: Aug. 18, 1971

[21] Appl. No.: 172,639

[52] U.S. Cl............ 267/139, 293/3, 293/70, 188/1 B
[51] Int. Cl............................................. F16g 9/32
[58] Field of Search................. 267/139, 140, 116; 293/3, 70; 188/1 B

[56] References Cited
UNITED STATES PATENTS
3,494,607  2/1970  Rusch .......................... 267/116

Primary Examiner—James B. Marbert
Attorney—Wilson & Fraser

[57] ABSTRACT

A method of absorbing energy wherein a plurality of elastomeric particles absorb energy by virtue of shear forces and friction created by interaction between a thrust member and a container for the particles which container is adapted to receive the thrust member and allow passage of the member therethrough. The particles may pass through openings in the thrust member as well as between the thrust member and the container for the particles and may be retained in the container or discharged from the container. In one application of the invention, the particle container is mounted on a vehicle and the thrust member is attached to a bumper by suitable linkage to absorb the energy of an impact force on the bumper when the bumper is engaged between the vehicle and another object.

33 Claims, 8 Drawing Figures

PATENTED JUL 24 1973 3,747,915
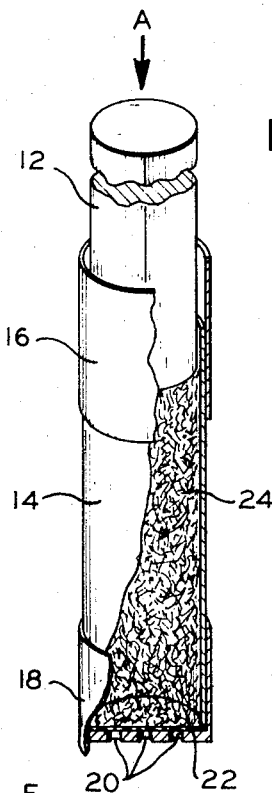
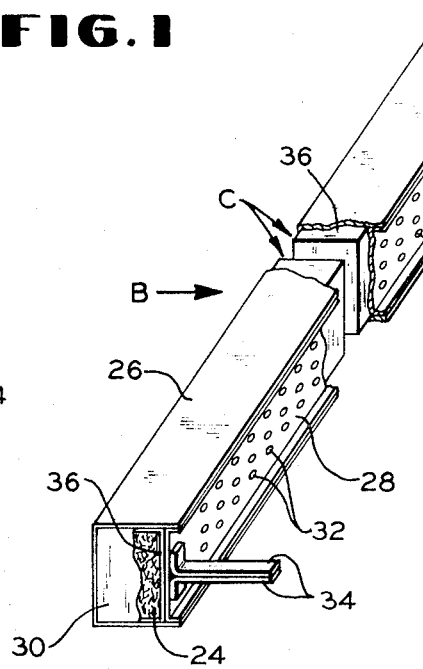
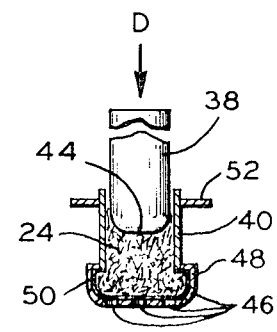
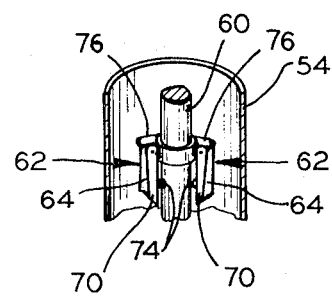
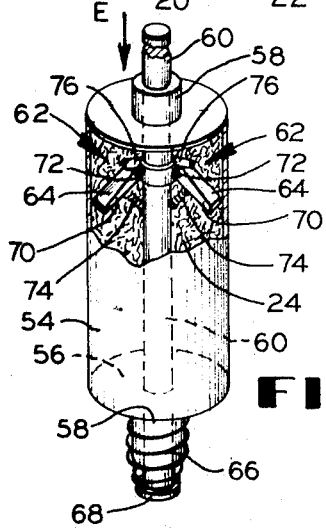
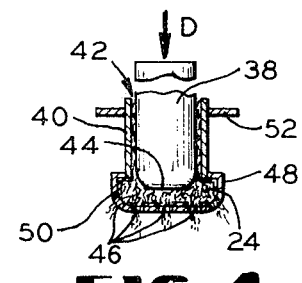
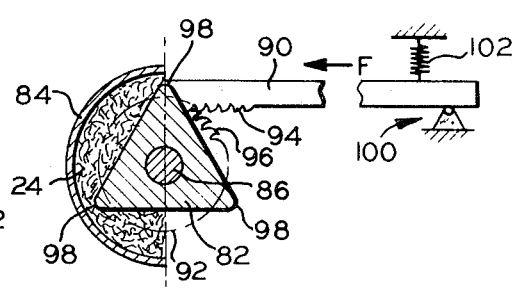
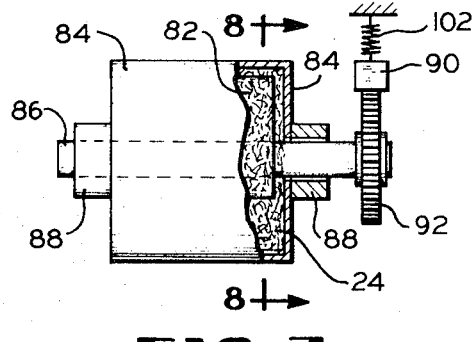
INVENTOR.
FRANK KENNETH HALL
BY Wilson & Fraser
ATTORNEYS

METHOD AND APPARATUS FOR ABSORBING ENERGY

BACKGROUND OF THE INVENTION

Energy absorbing devices are numerous in the prior art with one of the most common forms being a shock absorber. With the ever increasing demands on automobile safety, numerous energy absorbing devices having been developed for absorbing the impact on a vehicle bumper caused by engagement of the bumper between a stationary object and a moving vehicle or between a moving object and a stationary vehicle. The latter devices are often considered kinetic energy absorbers because the objective of the devices is to convert the kinetic energy of the moving object and/or vehicle into heat or similar energy thereby bringing the vehicle or object to rest without exerting excessive forces on the vehicle and the passengers therein.

A readily recognizable form of shock absorber is a piston mounted in a cylinder charged with liquid. Interconnecting the piston to an impact receiving member by a piston rod dissipates an impact by forcing the piston against the liquid which is discharged through an orifice in the cylinder to absorb the energy of the impact force. Modifications of the shock absorber using the same principle of energy absorption include water filled bumpers of resilient material having orifices with releasable plugs and similar bumpers wherein the water is replaced with liquid impregnated porous elastomeric foam encased in an impervious skin. Upon impact on the bumper containing the foam, the water is forced through orifices in the supporting structure adjacent the impervious skin by rupturing the skin. For uses other than bumpers, foamed plastic material and gases such as air have been used as energy absorbing media where generally smaller impact forces than those applied to bumpers are involved.

Water bumpers and the modifications thereof, mentioned above, are bulky and heavy thereby resulting in a vehicle which is undesirably heavy and oversized. These shock absorbers in general are not reuseable unless recharged assuming no other permanent damage has occurred. Where an impervious skin is used to contain a liquid, the ruptured skin must be replaced after impact. Further, the shock absorber which is designed for a specific magnitude of impact tends to act as a rigid element at lower magnitudes of impact.

Significant advances have been made in overcoming the problems of bulk and rigidity at lower magnitudes of impact than the maximum impact anticipated. One energy absorber combines a compression spring with a body capable of being extruded. The spring operates by Hooks Law with force being proportional to displacement of the spring and increasing with compression of the spring until the force required to extrude the extrusion body is reached or exceeded causing the body to be extruded. Light impacts are absorbed by compression of the spring and there is a smooth transition from the lighter impacts to the maximum impact to be absorbed by increased compression of the spring until the force required for extrusion is reached.

Generally, the magnitude of force acceptable for absorption of energy by a spring is limited in the bumper application because of the rebound effect of a spring. There is a natural characteristic of a compressed spring to return to its original shape. Where the rebound force approaches the maximum impact forces available, it becomes as serious a force to contend with as the impact force itself if released against the vehicle. To overcome the rebound problem where a compression spring is used, latching means have been incorporated into the energy absorber to retain the spring in the compressed state upon application of an impact force of a magnitude which would result in large rebound force.

Elimination of the rebound characteristic has been the goal in the use of a sequentially arranged plurality of extrusion bodies with each subsequently extruded body having a higher modulus of elasticity than the previously extruded body to provide an increasing resistance to impact and an increasing capability to absorb energy. A single extrusion body with a varying orifice through which the body is extruded to vary the force and associated energy which may be absorbed has also been used.

Many problems are associated with the above energy absorbers in addition to the rebound problem pointed out above. Like the discharged liquid of a shock absorber, a body stressed beyond its elastic limit is not reuseable and must be replaced. Further, the shape and size of the extrusion opening are critical. An extrusion body of liquid or semi-liquid, such as wax, encased in a container results in rupturing the container upon impact rendering the energy absorber inoperable until the container and charge therein is replaced.

Prior art devices of an extrusion nature have considered materials such as liquids, bodies of rubber or lead and a mass of packed aluminum particles as extrudable materials. Where the material has been of a nature which allows the material to displace upon impact, such as sand, gravel or plastics, the energy absorbing devices have been stationary. Stationary devices, such as guard rail posts, present the problem of being permanently deformed upon impact.

The above problems are overcome by the present energy absorbing apparatus through use of a fluid material which accommodates displacement of the impact receiving member. Displacement of the fluid material in a non-destructive manner by the impact receiving member allows a combination of friction and shearing forces within the fluid material to absorb and dissipate energy. Further, absorption and dissipation of energy occurs from the compression of gas within the fluid material. Since the fluid material is used in a non-destructive manner, it can be reused without the necessity of replacing the fluid material subsequent to use of the device. The device is reuseable, also, as a result of not having to replace the fluid material. The displacement of the fluid material results in elimination of the rebound characteristics of the prior art devices.

SUMMARY

The present invention relates to energy absorbing devices and more particularly to energy absorbing apparatus for impact loads, ie., loads having a mass and a velocity. A container holding a fluid mass and having a thrust member mounted for movement relative to the fluid are the basic components of the system. The system is illustrated in forms for two basic types of operation, lineal or rotational. In the lineal system the container can be a cylinder and the thrust member an associated piston of either a solid or perforated nature. Energy can be absorbed upon relative motion of the thrust member and container by displacement of the fluid medium through openings in the container. Where the thrust member is segmented, having impellers thereon, and the container constitutes a closed system for retention of the fluid, the fluid passes around the impellers on the member. Passage of the thrust member through the fluid initially at a high energy absorbing rate and returning it at a low energy absorbing rate results in a reuseable system.

The fluid is primarily a mass of elastomeric particles although other fluids such as gases or liquids can be mixed with the elastomeric particles. A fluid mass containing gas may be compressed initially with the particles being engaged and compacted between the thrust member and the container. A preferred form of the particles is a length of elastomer having spurs extending from its surface to provide a high coefficient of friction with solid surfaces and interlocking between adjacent particles.

Shear and friction forces are increased by engagement of the particles between the thrust member and the container, particularly where the particles pass through openings or between the sides of the thrust member and the container.

In the rotational system, the container is a cylinder of circular cross section and the thrust member can be one or more elements of a vane or paddle nature and advantageously can be a prism rotatable within the cylinder. In one embodiment the prism can include apexes thereon which are maintained in spaced relationship to the cylinder. The space between the apexes and the internal cylinder walls allows passage of the fluid while increasing the friction and shear forces on the fluid passing therebetween. In the rotational system, the fluid may be a liquid as well as any of the fluid masses described above for the lineal system.

In both systems, the impact is transmitted to the thrust member to give rise to the interaction of the individual particles as well as the particles with the thrust member and container respectively resulting in absorption of a major portion of the energy of impact.

The apparatus in the embodiments is particularly adaptable to use as an energy absorber for automobile or vehicle bumpers because of its compactness, lightweight construction, low cost, and reuseability either with or without recharging.

BRIEF DESCRIPTION OF THE DRAWINGS

FIG. 1 is a perspective view of one embodiment for absorbing energy in accordance with the present invention with portions cut away to reveal greater detail;

FIG. 2 is an alternate form of the apparatus in FIG. 1 adapted for use as a vehicle bumper;

FIG. 3 is a sectional view of apparatus for absorbing energy in accordance with the present invention illustrated prior to impact;

FIG. 4 is a view of the apparatus of FIG. 3 illustrated subsequent to impact;

FIG. 5 is a perspective view of a third embodiment for absorbing energy in accordance with the present invention with portions cut away to reveal greater detail illustrating the apparatus in position for impact;

FIG. 6 is a fragmentary perspective view of the apparatus of FIG. 5 illustrating the apparatus in the return position;

FIG. 7 is an elevational view of a reuseable apparatus for absorbing energy in accordance with the present invention with portions broken away to reveal greater detail; and FIG. 8 is a sectional view of the apparatus illustrated in FIG. 7 taken along line 8—8 with portions broken away to reveal details.

DESCRIPTION OF THE PREFERRED EMBODIMENT

In describing the energy absorbing apparatus, reference will frequently be made to vehicle bumpers and some illustrations of embodiments specifically designed for bumper use are illustrated for the purpose of more clearly describing the apparatus in a particular application. In referring to vehicle applications, it is noted that present criteria sought in a bumper is the capacity to absorb the energy resulting from an impact of 4,000 pounds at a velocity of 5 miles per hour against an immovable mass with the bumper limited to 4 inches of travel while transmitting a maximum force of 1,100 pounds to the frame of the vehicle.

It should be understood that the present energy absorbing apparatus while readily adaptable to use in vehicle bumpers, is not limited to such a use and is adaptable to many other uses and forms including shock absorbers, abutments, cushions, etc.

FIG. 1 illustrates an embodiment of apparatus for absorbing energy of the open type system wherein elements are discharged from the system. A piston 12 is received by a cylinder 14 having a collar 16 affixed to the piston end of the cylinder 14 through which the piston 12 is free to move. At the other end of the cylinder 14 a cap 18 is affixed which has a plurality of holes 20 passing through the end of the cap. Covering the holes 20 is a sheet of a material which can rupture to release pressure developed in the cylinder 14. One such sheet material is polyethelene film 22 extending across the interior of the cap 18.

With the impact applied to the piston 12 in a position illustrated in FIG. 1 and in a direction indicated by the arrow at A, the piston 12 moves within the cylinder 14 toward the cap 18 forcing the fluid 24 to rupture the sheet or membrane 22. Further displacement of the piston 12 in the cylinder 14 discharges the fluid 24 within the cylinder through the now exposed holes 20 in cap 18. The fluid 24 can be a mixture of gas and elastomeric particles. Generally, the elastomeric particles are a random aggregate with the gas surrounding the particles and occupying the space between them. In the embodiment illustrated in FIG. 1, the particles advantageously are shredded cured neoprene stock and the gas is air. Other elastomeric granules can be used, for example, shredded rubber from tires, with the choice depending upon the ambient conditions for the energy absorber, ie., at low temperature silicon rubber is a desirable elastomer granular form. Materials such as saw dust in a mixture with the above type products also can be used. Other gases can be used particularly in a closed system with the air being a most convenient gas for an open system. Under magnification, the granules of neoprene are found to have an elongate or stringy character with numerous spurs extending from their surfaces resulting in a large surface area for the fluid with a high coefficient of friction and an interlocking characteristic of the spurs between adjacent granules.

The magnitude of the force and the associated amount of energy which can be absorbed by the energy absorbing apparatus is a function of particle flow and dependent on particle distribution and surface configuration together with the size, number and configuration of openings such as the holes 20 of FIG. 1. There is a range, discussed below, over which the particle size may vary, but it was found that particles resulting from grinding rubber formed a powder rather than an elongate character and would not absorb satisfactorily the energy of impact.

A series of tests involving an impact of 1,000 pounds at 5 miles per hour illustrates the effect of some variables on the energy absorbing capabilities of one embodiment of the invention. These tests involved an absorber of the type shown in FIG. 1. A 1 inch diameter cylinder 14 was arranged to accommodate a stroke of piston 12 of up to 6 inches and was provided with a cap 18 having an end wall ⅛ inch thick. The fluid 24 was a mixture of air and neoprene stock. The neoprene stock consisted of particle mixture 20% of which was retained by a 20 mesh screen, 70% of which was retained by a 40 mesh screen, and the balance of which was retained by a 100 mesh screen. Initially, seven circular holes 20 of ¼ inch diameter were spaced over the end wall to provide an open area of approximately 0.35 square inches and a peripheral length of approximately 5 inches. A polyethelene film covered the holes 20. When the test impact was applied to this initial embodiment, the piston 12 was displaced less than four inches along its stroke and a force exceeding 1,100 pounds was transmitted to a beam to which collar 16 was affixed and upon which an impactograph was mounted to measure the force received by the beam.

In a second embodiment tested, the unit was modified by enlarging five of the holes to ⅜ inch diameter to produce an area of about 0.6 square inches and a peripheral length of 7.5 inches to take advantage of the full 4 inch stroke permissible under the presently set standards. This resulted in transmission to the beam of a force of less than 1,000 pounds under the test impact. Contrasting with these results it was found that the test impact resulted in a force indication transmitted to the beam of six to 10 times that of the second test when developed as an impact of steel on steel. For a force of 4,000 pounds at 5 miles per hour, a 6 inch diameter cylinder 14 with approximately 10 to 20 holes generally ⅜ inch diameter used with a 5.98 inch diameter piston will provide the same results as in the test model and limit the stroke to 4 inches.

The size, number, and configuration of the openings 20 to obtain the desired energy absorbing flow remains an experimental determination, but it has been found that a series of openings 20 is required rather than a single opening. For example, very little, if any, energy was absorbed by the apparatus using a single seven eighths inch diameter hole of the same approximate area of 0.6 square inches as the above seven holes. When the number of holes for a constant open area is increased substantially over the number used above, a point is reached where flow will no longer occur. Since the open area is constant between the single and multiple holes, the effectiveness of the multiple holes is in the increased peripheral surface available in the multiple holes over the single hole. Thus, it is the interaction between the particles of the fluid 24 and the periphery of the opening or openings through which the particles are passing which adds to the resistance of the apparatus to movement of the thrust member. When the opening becomes too small; however, a given size particle cannot pass and, therefore, even though the peripheral surface available has been increased it is not useable since the particle cannot pass. To optimize the apparatus the opening should be one which has a periphery as large as possible while restricting the distance between opposing walls of the opening so that the particles are retarded significantly either by direct contact with the walls or indirectly through particles retarded by the walls. Further, since the surface area of the periphery of the opening increases with the thickness of the member wherein the opening exists, an increase in the thickness of the member will also increase interaction between the particles and the openings until a point is reached where flow does not occur. Systems using liquids have been tried but exhibit some undesirable characteristics to initial impact and are incompressible thereby having little, if any, reaction to the periphery of the orifice through which it passes. In the present system the initial impact generally is absorbed by compression of the gas and compaction of the elastomeric particles. One of the distinct advantages of the fluid 24 of particles would seem to be the friction and shear forces created by the interlocking of the particles upon relative movement between the particles themselves and between the particles and the confining elements, ie., the cylinder 14, piston 12, and cap 18.

It has been theorized that there is a dual system of a compressible fluid 24 in a confined volume until rupture of the membrane 22 occurs at which point flow of particles gives results similar to the flow of the fluid. The compressibility of the fluid 24 results from a combination of compressing the gas therein and volumetric displacement or compacting of the particles. Flow of the particles from the cylinder 14 occurs after the particles are compacted. The initial release of the gas is thought to be the initiating force causing the flow of particles from the cylinder 14 activating the particles from a standstill to a moving or flow condition. Further, it is important to note that the particles passing through the openings 20 maintain their original shape after having been discharged from the cylinder 14. Thus, the elastic limit of the particles is not exceeded, as contrasted to prior art energy absorbers using the extrusion principle where the body is deformed by forces which cause the elastic limit of the body material to be exceeded. Since the particles are not extruded beyond their elastic limit, and friction alone does not appear to be sufficient to absorb the quantities of energy absorbed, there apparently is a shear force applied to the particles most particularly to passing through the openings 20 upon being discharged from the cylinder 14. The shear force theory is supported by the finding that the ability to absorb energy within the system increases with an increase in particle density thereby providing more shear area.

FIG. 2 illustrates a specific application of the embodiment of FIG. 1 wherein a bumper 26 having a "U" shaped cross section replaces the piston 12 of FIG. 1 as the thrust member. When an impact is applied to the bumper 26 in the direction indicated by the arrow at B, the bumper moves relative to the channel 28 to force the fluid 24 from the space formed by the bumper 26, channel 28 and end plates 30 (one illustrated). The fluid is discharged through a plurality of holes 32 in the channel 28 which is maintained stationary relative to a vehicle by fixedly attaching connecting members such as braces 34 to the support frame of a vehicle and to the channel 28. As an alternative to the membrane 22 illustrated in FIG. 1, the fluid is enclosed in polyethelene cartridges 36 with a plurality of cartridges 36 used over the length of the bumper 26 as illustrated at C. The polyethelene cartridges have film type walls which readily rupture when the pressure on the cartridges is increased. While a membrane 22 could also be used to close the vent holes 32, the cartridge 36 provides a more convenient means of replacing the fluid 24. Further, other materials could be used in place of the polyethelene film for the membrane 22 or container 36 such as metal foil or similar film materials. The channel 28 fits snugly within the open portion of the "U" shape of the bumper 26 and between the end plates 30 to accommodate relative movement between the bumper 26 and the channel 28.

FIGS. 3 and 4 illustrate another embodiment of the present apparatus with FIG. 3 representing the apparatus before impact and FIG. 4 after impact. It is one of the purposes of the embodiment of FIGS. 3 and 4 to increase the shearing and friction forces created upon impact by permitting the flow of particles of the fluid 24 between the walls of a piston 38 and cylinder 40 as the piston 38 travels from its initial to final position of displacement. The particles are illustrated between the walls of the piston 38 and cylinder 40 at 42 in FIG. 4. To encourage the interaction between the particles of fluid 24 and the piston 38 and cylinder 40, the piston 38 has a rounded nose 44 and a diameter sufficiently smaller than the internal diameter of the cylinder 40 to allow particles to flow between the piston 38 and cylinder 40 without allowing the particles to be forced past the piston 38 and out of the cylinder 40. All the particles discharged from the cylinder 40, therefore, must pass through the holes 46 of cap 48 which is affixed to the end of the cylinder 40 opposite that receiving the piston 38. The discharge from the cylinder 40 upon an impact being applied to the piston 38 in a direction indicated by the arrow at D is the same as that described for the embodiment of FIG. 1, ie., once the initial compression of fluid 24 ruptures a membrane 50, as illustrated in FIG. 4, the particles are forced one against the other in the direction of the cap 48 thereby creating friction and shearing forces resulting from interlocking of the particles and most particularly in passing the particles through the openings such as holes 46.

The cap 48 is a modification of the cap 18 of FIG. 1 being rounded to more clearly conform to the shape of the piston nose 44 and, therefore, having a greater area for accommodating openings 46 therein.

The friction and shear forces created by the interaction between the particles themselves and with the piston 38 and cylinder 40 through engagement between the walls of the piston 38 and cylinder 40 is in addition to the working of the particles discharged from the cylinder 40 thereby increasing the effectiveness of the energy absorbing apparatus. The increase in shear and friction forces results from the increase in area of shear and area of contact provided by the fluid 24.

The greater effectiveness is supported by test results on the apparatus. Using a scaled down version of a one inch diameter cylinder 40 and 15/16 inch diameter piston 38 a force and velocity equivalent to 4,200 foot pounds of energy was applied to the apparatus of FIGS. 3 and 4 with a flange 52 affixed to the cylinder 40 supported by roll pins, not illustrated, interconnecting the flange 52 with an immovable base, not illustrated. With the piston 38 moving through a stroke of 4 inches, the pins were not displaced indicating a force of less than 1,100 pounds was transmitted to the supporting structure, which in the case of a bumper application would be the frame of a vehicle, because the pins can only support 1,100 pounds without displacing. For a 4,000 pound force at a velocity of 5 m.p.h. a 3 ½ to 4 inches diameter cylinder 40 will be required with a stroke for piston 38 of 4 inches as compared to a 6 inch cylinder 14 and piston 12 in the embodiment of FIG. 1.

The above results were achieved using 1 1/2 oz. of particles of a mixture as described for the embodiment of FIG. 1. In charging the cylinder 40, a preload of 70 pounds is applied resulting in volumetric displacement of the fluid 24. Upon releasing the load, the particles within the fluid return to a natural or equilibrium state from the compacted state created by the preload. A shock load of less than one half the weight of the force applied was maintained for the above apparatus. Less than 2 pounds of particles will be sufficient for the 3 ½ inches to 4 inches diameter cylinder application.

At present, the diameter relationship of the piston 38 to the cylinder 40 to achieve interaction of particles therebetween resulting in an increase in energy absorption remains an experimental determination for various sized application of the apparatus. Various configurations can be used for the cylinders other than the circular cylinders illustrated such as square, hexagonal, etc., as long as the energy absorbing process is repeatable.

All the embodiments considered above are rendered inoperable after impact sufficient to discharge the mass of particles because the particles pass through openings external to the system and are not recoverable. FIGS. 5 through 8 present embodiments of energy absorbing apparatus which conserve the particles by maintaining them within the systems thereby creating a reuseable closed system. In the closed system, the thrust member is not a solid piston for driving and dispersing the particles but rather an impeller which can pass through the fluid 24 of gas and elastomeric particles. The closed system is reuseable because the fluid 24 is retained in the system and the thrust member can be reset without replacement of the fluid 24.

FIG. 5 illustrates a cylinder 54 having end plates 56 affixed to and sealing off the ends of the cylinder 54. Fixedly, attached to the end plates 56 are sleeves 58 in a manner concentric with apertures in the end plates 56 for receiving a shaft 60 which fits snugly within the sleeves 58 being slidable therein. The shaft 60 supports a thrust member in the form of a plurality of impellers 62 and the cylinder 54 walls. The impeller combines the feature of passing particles between a thrust member and a cylinder wall with the feature of passing the particles past the impellers 62 in a closed system which retains the fluid 24. A helical spring affixed to the end plate 56 and boss 68 on the end of the shaft 60 is extended upon the impellers 62 passing through the clyinder thereby loading the spring 66 to enable it to exert a force sufficient to return the impellers 62 to starting position. The paddles 64 are affixed to arms 70 which in turn are pivotally mounted on the shaft 60 at 72. To obtain the full effect of the impellers 62 upon an impact being applied to shaft 60 the springs 74 biase the arms 70 outwardly from the shaft 60 to a position of maximum engagement with the particles within the fluid 24. Keepers 76 are provided to limit the outward movement of the arms short of the cylinder 54 walls thereby establishing a clearance between the paddles 64 and the cylinder 54 walls. One skilled in the art will realize many variations can be used as to the type of impellers and the mechanism for extending them, for example, the paddles 64 can be conically shaped to more closely conform to the interior of the cylinder 54, or have holes therein to pass particles therethrough, and the arms 70 could be cam operated with respect to the movement of the shaft 60, etc. FIG. 6 illustrated the arms 70 in a retracted position which is the position assumed when the shaft 60 is on the return stroke after the impact. The movement of the impellers against the fluid 24 causes the retraction of the impellers 62 to allow the impellers 62 to be easily returned to the initial position at a lower energy level. Thus, the system is reuseable and since the return of the impellers 62 can be accomplished in the retracted position the spring force required for its return is well below the level which would result in detrimental rebound.

It will be noted that the shaft 60 extending through the cylinder 54 provides a constant volume in which the thrust member, the impellers 62, travel and as a consequence reduces the number of variables in the system. For other applications, the shaft 60 need not extend beyond the impellers 62 and the spring 66 would be placed on the impact end of the shaft 60.

FIGS. 7 and 8 illustrate energy absorbing apparatus using a rotational motion to achieve the interaction between a thrust member such as the triangular prism 82 and the container confining the fluid 24 of the same mixture as described for the embodiment disclosed above, such as the housing 84. The prism 82 is fixedly mounted to shaft 86 with the shaft rotationally mounted in bearings 88 affixed to the housing 84. For application as an energy absorbing apparatus for a vehicle bumper, the housing 84 would preferably be mounted on the frame of the vehicle and a rack 90 interconnected between the vehicle bumper, not illustrated, and a gear 92 affixed to the shaft 86. An impact on the bumper results in a force being applied to the rack 90 in the direction of the arrow at F of FIG. 8. Engagement of the rack teeth 94 with the gear teeth 96 causes the gear 92, shaft 86 and prism 82 to rotate. The rack 90 and gear 92 teeth are engageable in one direction with the teeth 94 and 96 inclined to the opposite direction to cause relief in an upward direction for return of the rack 90. Control of relief of the rack 90 can be accomplished by pivoting the rack, as at 100, with a biasing spring 102 to maintain contact for movement in the engaging direction. One means of returning the rack would be a spring affixed to the rack which is loaded by movement of the rack 90 upon impact and returns the rack 90 with the stored energy in the spring.

Applications other than vehicle bumpers, described above for the prior embodiments are applicable to the apparatus of FIGS. 7 and 8 as well. The symmetrical geometry of a triangular prism 82 enhances uniformity and repeatability of performance of the apparatus, but other shapes of thrust member, for example, elements of the vane or paddle type, could be used. Other fluids for less demanding applications could also be used including liquids. Further, the effectiveness of the thrust member can be implemented by fingers or baffles attached to either the thrust member or the container or both. In addition, more than one thrust member could be incorporated within the container.

In at least one modification, the fingers or baffles could be coordinated with the apexes 98 of the prism 82 where the clearance between the apexes 98 and the housing 84 are such as to cause a high degree of interaction between the fluid 24, apexes 98 and housing 84. The above modifications to the prism 82 can extend radially from shaft 86 or can be inclined thereto. Where the fluid 24 includes elastomeric particles, the clearance points become areas of high shear force upon the particles as they are forced by rotation of the prism 82 into engagement between the apexes 98 and housing 84.

Another modification would use baffles associated with the housing 84 to cause a volume, defined by two apexes 98 and the interior wall of the housing 84 extending therebetween, to be displaced past one of the apexes 98 to an adjoining like volume defined by the following apexes and the wall of the housing 84 as the prism 82 is rotated within the housing 84. The most common application in the above type system is to use an eccentric prism 82 or a plurality of prisms 82.

As in the embodiments of FIGS. 5 through 7, when using a fluid 24 having particles therein, the shear forces upon the particles of fluid 24 do not approach the yield stress of the particle material. Maintaining the shear force below the yield stress of the particle material and retaining the particle within the housing 84 results in a reuseable system. The rotational operation of the thrust member, prism 82, eliminates rebound since the forces of shear and friction between the thrust member, container and fluid are the same in either direction of rotation. The system is one capable of taking full advantage of the large surface area of the fluid 24 creating high friction and shear forces between the particles themselves and the particles and container and thrust members thereby increasing the amount of energy absorbed.

The above energy absorbing apparatus are a simplification in design over the devices of the prior art and have generally fewer components. Fewer components result in a more compact device which is rugged because there are fewer elements to fail. The apparatus is responsive to initial impact using a single impact receiving body as opposes a series of such bodies having varying materials in the prior art devices. Cost reductions result from the compactness of the present apparatus and the inexpensiveness of the elastomeric particle fluid. The high rate at which the fluid of elastomeric particles can absorb energy allows for lighter construction over the prior art devices. Lighter construction of the apparatus also reduces the cost of manufacturing. Where the apparatus forms a closed system, the fluid is retained and therefore doesn't have to be replaced thereby eliminating maintenance. Retention of the fluid results in an energy absorbing process which is repeatable and thus apparatus which is reuseable.

In view of the variations in the structures embodying the invention and the wide range of their utilization, it should be understood that the above disclosure is merely illustrative and should not be read in a limiting sense. The invention may be practiced otherwise than as specifically illustrated and described without departing from its spirit or scope.

I claim:

1. Apparatus for absorbing energy comprising a fluid mass including discrete elastomeric particles individually movable with respect to each other within said fluid mass, a container for the fluid, a thrust member movable within said container for causing interaction between the individual elastomeric particles of said fluid and between the particles and said container and trust member respectively thereby causing friction and shear forces to arise and resist an impact transmitted to said thrust member resulting in absorption of a major portion of the energy of impact.

2. Apparatus defined in claim 1 wherein the particles of said fluid are elongate.

3. Apparatus defined in claim 1 wherein the particles of said fluid include spurs extending from the surface thereof to increase the resistance to shear forces and the coefficient of friction of the particles with respect to each other, with respect to said container and with respect to said thrust member.

4. Apparatus defined in claim 1 wherein said fluid includes gas surrounding and filling the space between the particles.

5. Apparatus defined in claim 1 wherein said container includes openings therein for discharging said fluid.

6. Apparatus defined in claim 5 including a membrane closing said openings and retaining said fluid until impact ruptures said membrane.

7. Apparatus defined in claim 5 wherein said thrust member includes a piston for forcing the fluid through said openings and fitting said container so as to prevent a flow of said fluid from the piston receiving end of said container.

8. Apparatus defined in claim 1 wherein said thrust member forms a portion of said container and said container includes a member having openings therein for discharging the fluid, said thrust member being movable relative to said member having openings therein.

9. Apparatus defined in claim 8 wherein said thrust member includes a "U" shaped bumper with end plates for forcing the fluid from between said bumper and said thrust member through said openings.

10. Apparatus defined in claim 1 including a cartridge enclosing said fluid having a thin wall for rupturing upon an impact being applied to said thrust member.

11. Apparatus defined in claim 1 wherein said container is cylindrical and said thrust member is spaced from the walls of said cylinder over a substantial length of said walls when within said cylinder to allow passage of fluid between said thrust member and cylinder walls thereby causing friction and shear forces to arise between the particles of said fluid and the walls of said cylinder and said thrust member.

12. Apparatus defined in claim 11 wherein said piston includes a rounded nose portion for dispersing the fluid to the walls of said piston and container.

13. Apparatus defined in claim 1 wherein said thrust member includes a shaft and at least one impeller, said impeller mounted on said shaft within said container and said shaft extending from said container for receiving the impact thereon.

14. Apparatus defined in claim 13 wherein said container is cylindrical and said impeller is spaced from the walls of said cylinder over a substantial length of said walls when within said cylinder to allow passage of fluid between said impeller and cylinder walls thereby causing friction and shear forces to arise between the particles of said fluid and the walls of said piston and cylinder as said piston traverses the inside of said cylinder.

15. Apparatus defined in claim 14 wherein said impeller includes paddles thereon for passage of particles therepast.

16. Apparatus defined in claim 13 wherein said impeller includes paddles thereon for passage of particles therepast.

17. Apparatus defined in claim 13 including means for returning said shaft and impeller to a starting position subsequent to impact.

18. Apparatus defined in claim 17 including a spring interconnecting said container with said shaft for returning said shaft to a starting position subsequent to impact.

19. Apparatus defined in claim 13 wherein said shaft extends through said container parallel with the longitudinal axis of said container to guide said impeller in its travel within said container.

20. Apparatus defined in claim 13 wherein said impeller includes an arm movably connected to said shaft for retracting said impeller to said shaft.

21. Apparatus defined in claim 20 including means for selectively maintaining said arms in an extended position from said shaft.

22. Apparatus defined in claim 21 wherein said means for maintaining an extended position includes a spring biasing said arm outwardly from said shaft.

23. Apparatus defined in claim 20 including means for limiting the movement of said arm outwardly from said shaft.

24. The method of absorbing the energy of impact between two objects comprising the steps of:
passing a thrust member through a fluid including discrete elastomeric particles individually movable with respect to each other within said fluid at a high energy absorbing rate upon transmission of an impact to the thrust member; and
returning the thrust member through the fluid at a low energy absorbing rate subsequent to the impact whereby friction and shear forces are caused to arise and resist the impact transmitted to the thrust member at a high energy absorbing rate resulting in absorption of a major portion of the energy of impact.

25. Apparatus for absorbing energy comprising a fluid, a container for the fluid, and means rotatable with said container for causing interaction between the fluid and said container and rotatable means respectively thereby causing frictional and shear forces to arise and resist an impact transmitted to said rotatable means resulting in absorption of a major portion of the energy of impact.

26. Apparatus defined in claim 25 wherein said rotatable means includes at least one thrust member.

27. Apparatus defined in claim 26 wherein ssid thrust member is a triangular prism.

28. Apparatus defined in claim 27 wherein said container is a cylindrical housing of circular cross section.

29. Apparatus defined in claim 28 including a shaft passing through said cylinder parallel to the axis thereof and supporting said triangular prism together with gear means external to the cylinder for driving said prism on said shaft by engaging said gear means with a rack receiving the impact.

30. Apparatus defined in claim 27 wherein said triangular prism includes apexes spaced from the inside walls of said cylinder to cause shear and friction forces to arise between said apexes and the walls of said cylinder, respectively, with the fluid passing therebetween.

31. Apparatus defined in claim 30 wherein the fluid includes elastomeric particles therein for frictionally engaging said apexes and cylinder while shear forces are exerted on the particles by said apexes upon rotation of said prism.

32. The method of absorbing the energy of impact between two objects comprising the steps of:
providing a fluid having discrete elastomeric particles individually movable with respect to each other within said fluid therein within a container; and
passing a thrust member through the fluid within the container to cause the fluid displaced thereby to absorb energy.

33. The method of absorbing the energy of impact between two objects comprising rotating a first member relative to a second member to cause constrained flow of a fluid therebetween.

* * * * *